United States Patent
Ikeda et al.

(10) Patent No.: US 8,112,042 B2
(45) Date of Patent: Feb. 7, 2012

(54) WIRELESS COMMUNICATION DEVICE CAPABLE OF MEASURING QUALITY OF WIRELESS SIGNAL AT VARIABLE TIME INTERVALS

(75) Inventors: Yuji Ikeda, Saitama (JP); Yasuhiko Hiehata, Saitama (JP)

(73) Assignee: KDDI Corporation, Tokyo (JP)

( * ) Notice: Subject to any disclaimer, the term of this patent is extended or adjusted under 35 U.S.C. 154(b) by 267 days.

(21) Appl. No.: 12/644,662

(22) Filed: Dec. 22, 2009

(65) Prior Publication Data

US 2010/0159843 A1 Jun. 24, 2010

(30) Foreign Application Priority Data

Dec. 24, 2008 (JP) ................................. 2008-328766

(51) Int. Cl.
*H04B 17/00* (2006.01)
(52) U.S. Cl. .................. 455/67.13; 455/67.11
(58) Field of Classification Search .......... 455/423–425, 455/63.1, 67.11–67.16, 115.1–115.4, 226.1–226.4; 375/224–228; 370/241, 241.1, 252, 253
See application file for complete search history.

(56) References Cited

U.S. PATENT DOCUMENTS

| | | | | |
|---|---|---|---|---|
| 6,278,701 B1 * | 8/2001 | Ayyagari et al. | ............... | 370/335 |
| 6,961,316 B2 * | 11/2005 | Yamaguchi et al. | .......... | 370/252 |
| 7,002,920 B1 * | 2/2006 | Ayyagari et al. | ............... | 370/252 |
| 7,392,017 B2 * | 6/2008 | Chu et al. | .................... | 455/67.11 |
| 7,447,512 B2 * | 11/2008 | Ben-Eli | .......................... | 455/513 |
| 7,460,869 B2 * | 12/2008 | Pekonen et al. | ................. | 455/436 |
| 7,522,657 B2 * | 4/2009 | Ahmed et al. | ................. | 375/219 |
| 7,734,255 B2 * | 6/2010 | Matsunaga | .................. | 455/63.1 |
| 7,738,864 B2 * | 6/2010 | Donovan et al. | ............... | 455/425 |
| 7,746,766 B2 * | 6/2010 | Kowalski et al. | .............. | 370/208 |
| 7,822,129 B2 * | 10/2010 | Litsyn et al. | ................... | 375/260 |
| 7,826,796 B2 * | 11/2010 | Matsunaga | .................. | 455/63.3 |
| 7,986,672 B2 * | 7/2011 | Tiedemann et al. | .......... | 370/332 |
| 2009/0257532 A1 * | 10/2009 | Skiscim et al. | ............... | 375/343 |

FOREIGN PATENT DOCUMENTS

JP 2006-332988 A 12/2006

* cited by examiner

*Primary Examiner* — Tuan A Tran
(74) *Attorney, Agent, or Firm* — Westerman, Hattori, Daniels & Adrian, LLP

(57) ABSTRACT

A wireless communication device is disclosed in which signal quality values C[t] of a wireless signal received by the wireless communication device is successively measured at variable time intervals Δt, mean value μ of the successively-measured signal quality values C[t] is calculated, standard deviation σ of the successively-measured signal quality values C[t] is calculated, a determination is made as to whether the signal quality value C[t] at present time satisfies a predetermined inequality which represents that a signal quality value C[t] at arbitrary time lies within k times the standard deviations σ away from the mean value μ, and lengths of the time intervals Δt for the measurement device are controlled based on the determination.

11 Claims, 11 Drawing Sheets

WIRELESS COMMUNICATION DEVICE CAPABLE OF MEASURING QUALITY OF WIRELESS SIGNAL AT VARIABLE TIME INTERVALS

CROSS-REFERENCE TO RELATED APPLICATIONS

The present application is based on and claims the benefit of priority from Japanese Patent Application No. 2008-328766 filed Dec. 24, 2008, the content of which is incorporated herein by reference in its entirety.

BACKGROUND OF THE INVENTION

1. Field of the Invention

The invention relates generally to wireless communication devices capable of successively measuring, at variable time intervals, signal quality of a received wireless signal by the wireless communication devices, and more particularly to improvements in the techniques of controlling the lengths of the time intervals.

2. Description of the Related Art

In recent years, a wide variety of wireless communication systems (e.g., schemes, standards) have become popular, which include, for example, mobile communication systems and wireless LAN (Local Area Network) communication systems. Techniques are also known which are directed to a wireless communication device (i.e., a multi-band receiver) which uses different types of wireless communication systems simultaneously or selectively.

Such a wireless communication device, because of the use of different types of wireless communication systems, allows a current one of the communication systems to switch, if it becomes unavailable (e.g., when exiting a cell or area boundary), into an alternative one of the communication systems, resulting in undisruptive or seamless communication.

In this regard, for such a wireless communication device to achieve seamless switching between different communication systems, there is a need to periodically or successively monitor or measure, during communication under a current one of the communication systems, signal quality of a received wireless signal under an alternative one of the communication systems.

Where the signal quality is successively measured at variable time intervals $\Delta t$, if the time intervals $\Delta t$ are relatively shortened, then the wireless communication device can follow rapid change in the signal quality. In this case, however, a count of times that signal quality is measured is increased, which invites an increased amount of electric power consumption.

If, however, the time-intervals $\Delta t$ are relatively extended, then the wireless communication device cannot follow rapid change in the signal quality.

FIGS. 1A and 1B illustrate in functional block diagram an exemplary prior-art wireless communication device 1 capable of measuring signal quality (e.g., CINR (Carrier to Interference and Noise Ratio)) of the received wireless signal at time intervals $\Delta t$.

As illustrated in FIG. 1A, the aforementioned exemplary prior-art wireless communication device 1 is configured to include: a data transmission/reception device 100; at least one communication interface 111 (for an alternative example, communication interfaces 111 and 112); a signal-quality measurement device 121 for measuring wireless signal quality at time intervals $\Delta t$; an FIR (Finite Impulse Response) filter 122; and a time-interval controller 123 for controlling the lengths of the time intervals $\Delta t$ for measurement of the signal quality.

Japanese Patent Application Publication No. 2006-332988 discloses a linear prediction technique of an SIR (Signal to Interference Ratio), using an FIR filter.

The communication interface 111, in operation, communicates with base stations or access points via a wireless network.

The signal-quality measurement device 121 measures a signal quality value at time t, which is denoted by C[t], in connection with the communication interface 111. More specifically, the signal-quality measurement device 121 measures the signal quality values C[t] at the time intervals $\Delta t$ indicated by the time-interval controller 123. The measurements of the signal quality values C[t] are delivered to the FIR filter 122.

As illustrated in FIG. 1B, the FIR filter 122 performs linear prediction by convolution calculation, using a plurality of signal quality values C[t] previously obtained, to thereby estimate a future or subsequent signal-quality-value C[t].

FIG. 1B illustrates an example in which the FIR filter 122 has a tap count L=5. The FIR filter 122 sums up previous quality values obtained at previous times t−4 to t, respectively, with weights (e.g., tap weights) given to these quality values, and estimates a signal quality value at subsequent time t+1 from the sum of the weighted signal-quality-values.

The FIR filter 122 estimates a signal quality value at time t+2 by recursive entry of the estimated signal-quality-value at time t+1. Thus, the FIR filter 122 repeats calculation using previously-estimated signal quality value.

As illustrated in FIG. 1A, the time-interval controller 123 controls the lengths of the time intervals $\Delta t$ which the signal-quality measurement device 121 measures the signal quality, as a function of the future signal quality value estimated by the FIR filter 122.

More specifically, in an exemplary implementation, the time-interval controller 123 determines that, if the estimated future signal-quality is at the same level as the current signal-quality, temporal changes in signal quality are slight or gentle.

In this case, the time-interval controller 123, because there is no need to monitor the signal quality frequently, extends the time intervals.

If, however, a change of the estimated future signal-quality from the previous signal quality is larger than a change of the current signal quality from the previous signal quality, the time-interval controller 123 determines that temporal changes in signal quality are instable.

In this case, the time-interval controller 123, because there is a need to monitor the signal quality frequently, shortens the time intervals.

The exemplary prior-art wireless communication device above described, however, uses an FIR filter only for the purpose of determining the lengths of the time intervals at which signal quality is measured.

Such an FIR filter would require a large amount of computation for convolution calculation. Notably, because such an FIR filter performs recursive linear-prediction, prediction errors, once occurring, would adversely affect subsequent estimation of signal quality. This can lead to significant degradation in estimation precision of future signal quality.

In view of the foregoing, it would be desirable to adaptively control the lengths of time intervals at which signal quality is measured, depending on the status of temporal changes in signal quality, without requiring an increased amount of computation for measuring signal quality.

BRIEF SUMMARY OF THE INVENTION

In general, the invention relates to techniques of measuring signal quality of a wireless signal received by a wireless communication device, at variable time intervals, and of controlling the lengths of the time intervals, based on the status of temporal changes in signal quality.

According to some aspects of the invention, signal quality values C[t] of a wireless signal received by a wireless communication device is successively measured at variable time intervals Δt, mean value μ of the successively-measured signal quality values C[t] is calculated, standard deviation σ of the successively-measured signal quality values C[t] is calculated, a determination is made as to whether the signal quality value C[t] at present time satisfies a predetermined inequality which represents that a signal quality value C[t] at arbitrary time lies within k times the standard deviations σ away from the mean value μ, and lengths of the time intervals Δt for the measurement device are controlled based on the determination.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

General Overview

Figure 1A:
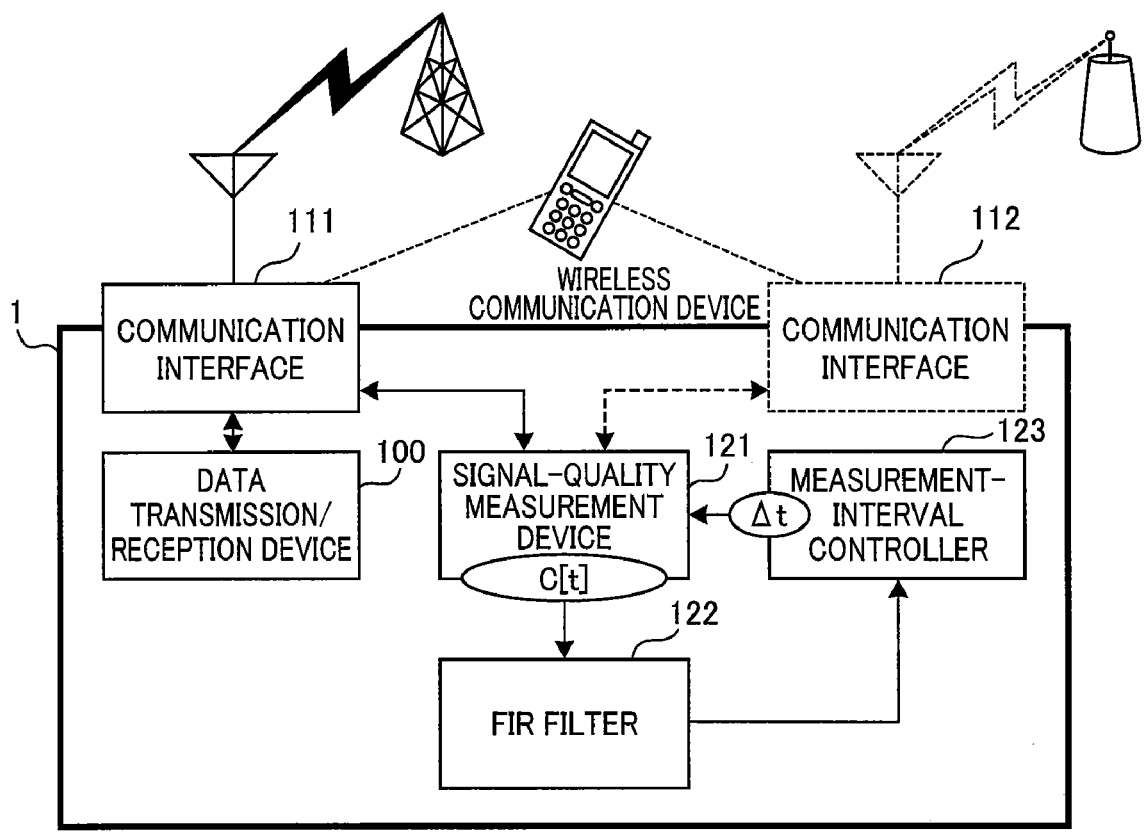
FIG. 1A is a functional block diagram schematically illustrating an exemplary prior-art wireless communication device capable of measuring signal quality of a received wireless signal at variable time intervals.
Figure 1B:
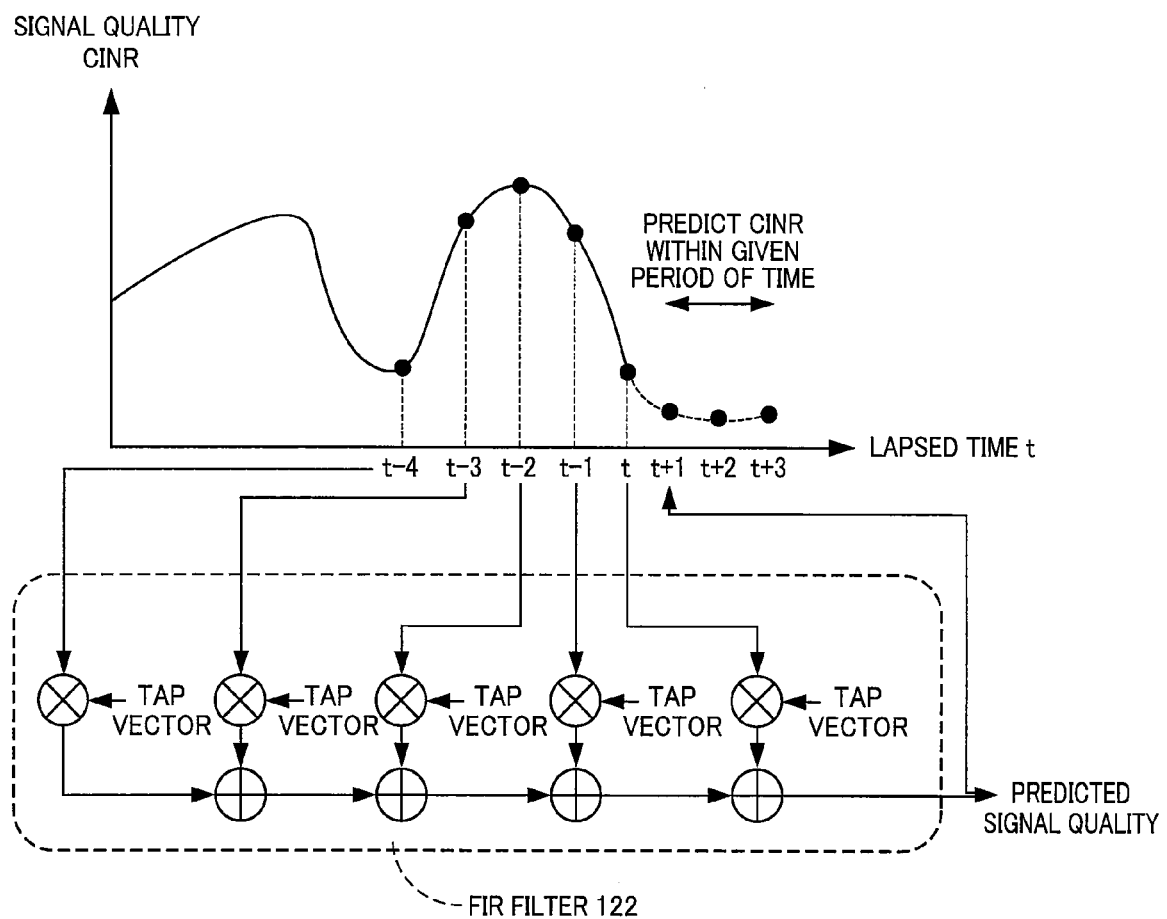
FIG. 1B is a functional block diagram schematically illustrating an FIR filter depicted in FIG. 1A.

According to a first aspect of the invention, there is provided a wireless communication device, comprising:

a measurement device configured to successively measure, at variable time intervals Δt, signal quality values C[t] of a wireless signal received by the wireless communication device, wherein C[t] denotes a signal quality value of the received wireless signal measured at time t;

a mean-value calculator configured to calculate mean value μ of the successively-measured signal quality values C[t];

a standard-deviation calculator configured to calculate standard deviation σ of the successively-measured signal quality values C[t];

a determination section configured to make a determination as to whether the signal quality value C[t] at present time satisfies a predetermined inequality which represents that a signal quality value C[t] at arbitrary time lies within k times the standard deviations σ away from the mean value μ, wherein k denotes a region coefficient; and an adaptive controller configured to control lengths of the time intervals Δt for the measurement device, based on the determination made by the determination section, wherein the adaptive controller relatively shortens the time intervals Δt if the predetermined inequality is not satisfied.

This wireless communication device, by making a determination as to whether a present signal-quality-value satisfies a predetermined inequality which represents that a signal quality value lies within k times the standard deviations away from the mean value, would allow time intervals at which signal quality values are measured, to be controlled adaptively to temporal changes in the signal quality values, without requiring an increased amount of computation for monitoring the signal quality values.

According to a second aspect of the invention, there is provided a method of measuring signal quality in a wireless communication device, comprising the steps of:

successively measuring, at variable time intervals Δt, signal quality values C[t] of a wireless signal received by the wireless communication device, wherein C[t] denotes a signal quality value of the received wireless signal measured at time t;

calculating mean value μ of the successively-measured signal quality values C[t];

calculating standard deviation σ of the successively-measured signal quality values C[t];

making a determination as to whether the signal quality value C[t] at present time satisfies a predetermined inequality which represents that a signal quality value C[t] at arbitrary time lies within k times the standard deviations σ away from the mean value μ, wherein k denotes a region coefficient; and adaptively controlling lengths of the time intervals Δt, based on the determination, wherein the step of adaptively controlling includes a substep of relatively shortening the time intervals Δt if the predetermined inequality is not satisfied.

This method, by making a determination as to whether a present signal-quality-value satisfies a predetermined inequality which represents that a signal quality value lies within k times the standard deviations away from the mean value, would allow time intervals at which signal quality value are measured, to be controlled adaptively to temporal changes in the signal quality values, without requiring an increased amount of computation for monitoring the signal quality values.

Illustrative Embodiments

According to the invention, the following modes are provided as illustrative embodiments of the invention.

According to a first mode of the invention, there is provided the wireless communication device according to the first aspect of the invention, wherein the predetermined inequality is an inequality which represents a precondition based on Chebyshev's inequality.

According to a second mode of the invention, there is provided the wireless communication device according to the first aspect or the first mode of the invention, wherein the adaptive controller relatively extends the time intervals Δt if the predetermined inequality is satisfied.

According to a third mode of the invention, there is provided the wireless communication device according to any one of the first aspect, the first mode and the second mode of the invention, wherein the adaptive controller relatively shortens the time intervals Δt if a count of times that the determination section consecutively determines that the predetermined inequality is not satisfied reaches a predetermined count m.

According to a fourth mode of the invention, there is provided the wireless communication device according to any one of the first aspect and the first to third modes of the invention, wherein the mean-value calculator is configured to calculate the mean value μ as an exponentially smoothed average, with the following equation:

$$\mu[t]=(1-\alpha)\times\mu[t-1]+\alpha\times C[t],$$

where,

α: forgetting factor, and the standard-deviation calculator is configured to calculate the standard deviation σ, with the following equation:

$$\sigma[t]=\sqrt{(Sqr[t]-\mu[t]^2)},$$

where, $$Sqr[t]=(1-\alpha)\times Sqr[t-1]+\alpha\times C[t]^2, \text{ and}$$

α: forgetting factor.

According to a fifth mode of the invention, there is provided the wireless communication device according to any one of the first aspect and the first to third modes of the invention, wherein the mean-value calculator is configured to calculate the mean value μ as an arithmetic mean over a range of (t−L+1, t), with the following equation:

$$\mu[t]=(1/L)\times\Sigma C[T],$$

where,

L: a count of signal quality values C[t] to be summed up, and

ΣC[T]: a total sum of a set of signal quality values C[t] over a range of T=t−L+1 to T=t, and the standard-deviation calculator is configured to calculate the standard deviation σ, with the following equation:

$$\sigma[t]=\sqrt{((1/L)\times\Sigma(C[T]-\mu[t])^2)},$$

where, $\Sigma(C[T]-\mu[t])^2$: a total sum of a set of $(C[T]-\mu[t])^2$ over a range of T=t−L+1 to T=t.

According to a sixth mode of the invention, there is provided the wireless communication device according to any one of the first aspect and the first to fifth modes of the invention, wherein the predetermined inequality is $$Abs(C[t]-\rho[t])\leq k\sigma[t],$$

where,

Abs(C[t]−μ[t]): an absolute value of (C[t]−μ[t]).

According to a seventh mode of the invention, there is provided the wireless communication device according to any one of the first aspect and the first to sixth modes of the invention, wherein the adaptive controller controls the time intervals Δt, such that the time intervals Δt are longer when the predetermined inequality is not satisfied and when the signal quality value C[t] at present time is larger than the mean value μ, than when the predetermined inequality is not satisfied and when the signal quality value C[t] at present time is smaller than the mean value μ.

According to an eighth mode of the invention, there is provided the wireless communication device according to any one of the first aspect and the first to seventh modes of the invention, wherein each of the signal quality values C[t] represents a signal to noise ratio of the received wireless signal.

According to a ninth mode of the invention, there is provided the wireless communication device according to any one of the first aspect and the first to eighth modes of the invention, further comprising a plurality of communication interfaces used for respective different wireless communication systems, the communication interfaces including first and second communication interfaces, and the wireless communication systems including first and second wireless communication systems, wherein the measurement device is configured to measure the signal quality values C[t] of a wireless signal received via the second communication interface, during transmission/reception via the first communication interface used for the first wireless communication system, for handing over the first wireless communication system used for the first communication interface, to the second wireless communication system used for the second communication interface.

According to a tenth mode of the invention, there is provided a computer-readable medium having stored therein a program which, when executed by a computer, effects the method according to the second aspect of the invention.

The program which has been stored in this medium, upon executed by a computer, provides the same functions and effects as the method according to the second aspect of the invention.

The "computer-readable medium" may be realized in any one of a variety of types, including a magnetic recording medium, such as a flexible-disc, an optical recording medium, such as a CD and a CD-ROM, an optical-magnetic recording medium, such as an MO, an un-removable storage, such as a ROM, for example.

It is added that the second aspect of the invention may be embodied in combination with the limitation(s) set forth in any one of the first to ninth modes of the invention.

Several presently preferred embodiments of the invention will be described in more detail by reference to the drawings in which like numerals are used to indicate like elements throughout.

A wireless communication device 130 according to a first illustrative embodiment of the present invention will be described below by reference to the drawings.

Figure 2:
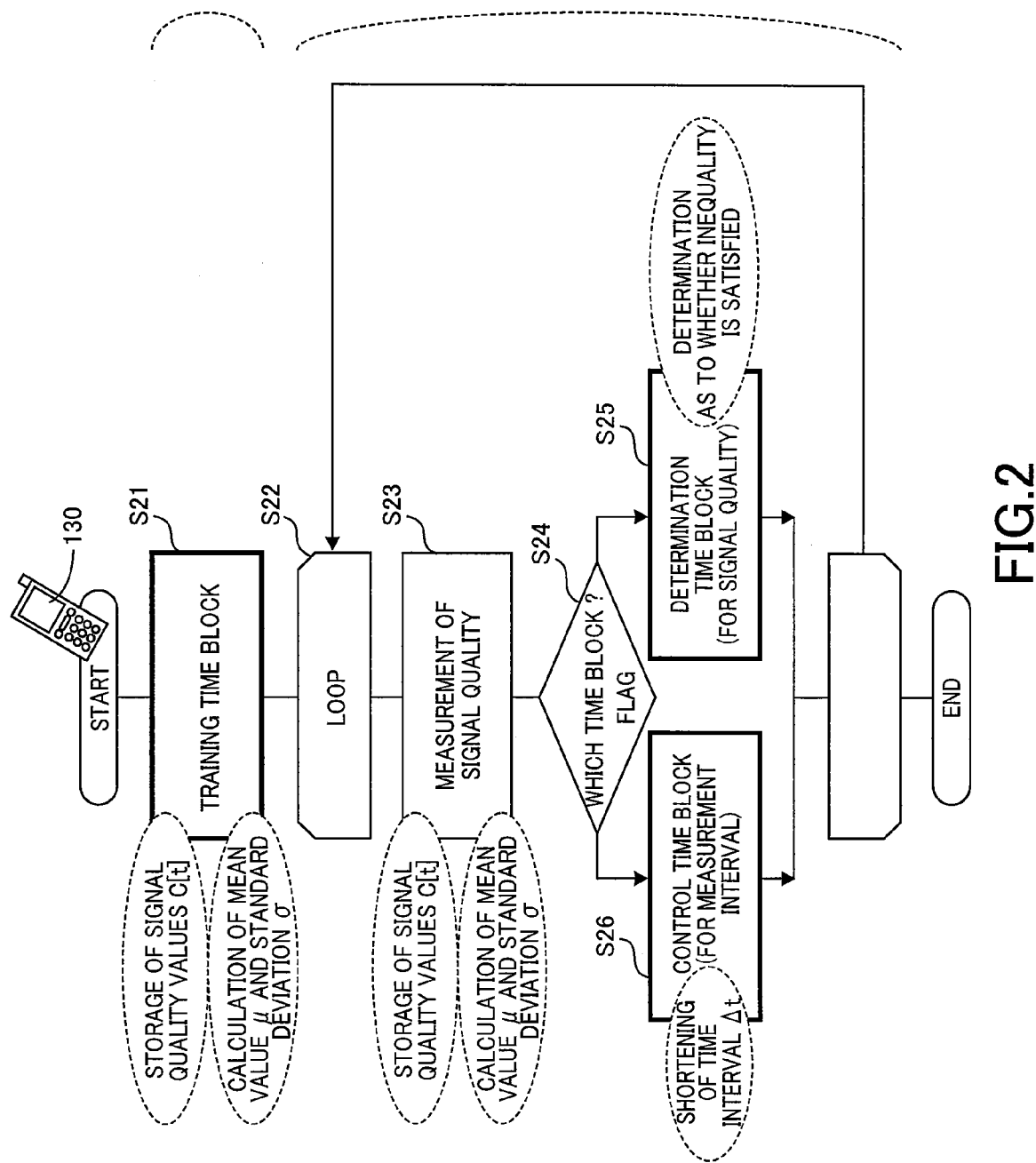
FIG. 2 is a flow chart schematically illustrating a computer-executable program for measuring signal quality of a received wireless signal by a wireless communication device constructed according to a first illustrative embodiment of the present invention.

Referring now to FIG. 2, a method is illustrated in flow chart, of measuring signal quality of the received wireless signal by the wireless communication device 130.

More specifically, FIG. 2 illustrates in flow chart a signal-quality measurement program executed by a processor (see FIG. 6) within the wireless communication device 130. The program has been stored in a memory (see FIG. 6) within the wireless communication device 130.

Step S21

The signal-quality measurement program starts with a step S21 to enter a "training time block" for storing signal quality values C[t−n]–C[t] during a predetermined time period. These signal quality values C are measured at time intervals Δt. Further, for these signal quality values C, the mean value μ and the standard deviation σ are calculated.

The time intervals Δt during the training time block are set to Δt1 which is relatively short (Δt1<Δt2'Δt2, as described later). This step S21 will be described in more detail below by reference to FIG. 4.

Each signal quality value C[t] is defined as a signal-to-noise ratio, one example of which is a CINR (Carrier to Interference and Noise Ratio).

The CINR is the ratio of power in a carrier signal to the interference and noise power. When the CINR is relatively high (i.e., when the carrier signal is higher in power than the interference and noise signal), it is recognized that the signal quality is good. On the other hand, When the CINR is relatively low (i.e., when the carrier signal is lower in power than the interference and noise signal), it is recognized that the signal quality is poor.

Alternatively, the signal quality may be defined, not to mention, as a CNR (Carrier to Noise Ratio), an SNR (Signal to Noise Ratio), an SINR (Signal to Interference and Noise Ratio), etc. However, hereinafter, the first illustrative embodiment will be described below, with the signal quality defined as a CINR.

Step S22

A step S22 follows to repeatedly execute steps S23-S26. The looped steps S22-S26 will be described in more detail below by reference to FIGS. 5A and 5B.

Step S23

A signal quality value C[t] at present time is entered, and, to reflect this signal quality value C[t], the mean value μ and the standard deviation σ are updated.

Step S24

A step S24 is implemented to make a determination as to which one of a "determination time block" or a "control time block" the process enters, and one of two branches depending from the step S24 (i.e., steps S25 and S26) is selected to be subsequently implemented, depending on the determination. When the step S24 is implemented for the first time, the determination time block is selected, for example.

Step S25

The process enters the "determination time block (for signal quality)" in which, because the variations in the signal quality are relatively small, the time interval Δt is set to Δt2 which is longer than Δt3 as described later.

Further, during the determination time block, a determination is being made as to whether a timing has come that the variation in the signal quality has become larger than the previous signal quality.

More specifically, in the first illustrative embodiment, a determination is made as to whether the signal quality value C[t] at present time satisfies a predetermined inequality which represents that a signal quality value C[t] lies within k times the standard deviations σ away from the mean value μ.

If this inequality is not satisfied, then the process enters the control time block. The predetermined inequality is, not limited to, an inequality representative of a precondition based on Chebyshev's inequality.

Step S26

The process enters the "control time block (for measurement interval)" in which, because the variations in the signal quality are relatively large, the time interval Δt is set to Δt3 which is shorter than Δt2 as described later), and the control time block continues until a given length of time lapses. Thereafter, the process returns to the "determination time block."

Figure 3:
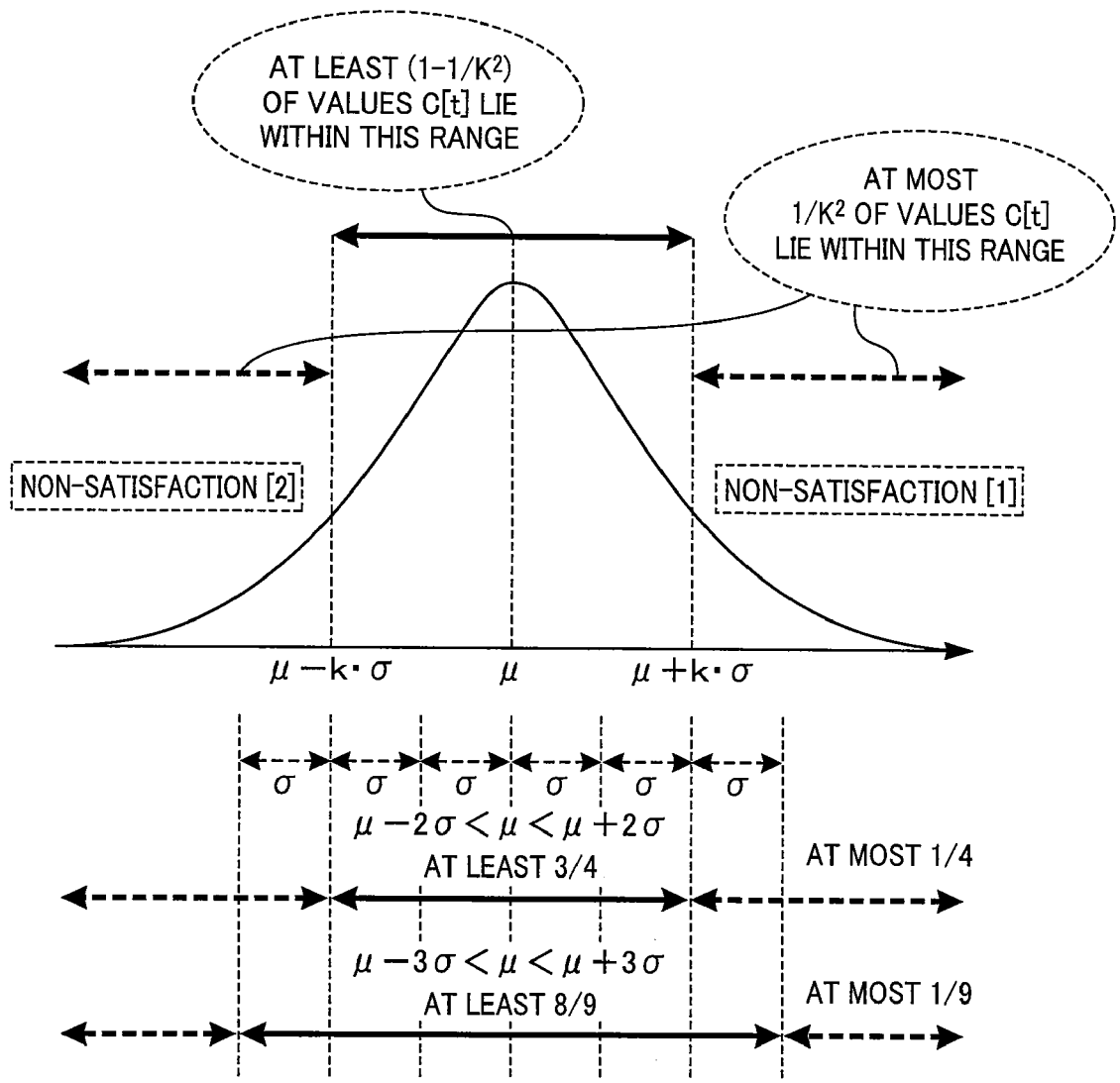
FIG. 3 is a graph for explanation of Chebyshev's inequality.

Referring next to FIG. 3, Chebyshev's inequality is illustrated in graph.

Chebyshev's theorem states that at least (i.e., no less than) $(1-1/k^2) \times 100\%$ of the values are within k times the standard deviations σ from the mean value μ (i.e., within the range of $(\mu-k\sigma, \mu+k\sigma)$). Conversely, Chebyshev's theorem states that at most (i.e., no more than) $1/k^2 \times 100\%$ of the values are outside k times the standard deviations σ from the mean value μ (i.e., outside the range of $(\mu-k\sigma, \mu+k\sigma)$). "k" is referred to as "range coefficient."

As illustrated in FIG. 3, at least $3/4 (=1-1/4) \times 100\%$ of the values are within 2 (i.e., k=2) times the standard deviations σ from the mean value μ (i.e., within the range of $(\mu-2\sigma, \mu+2\sigma)$). In addition, at least $8/9 (=1-1/9) \times 100\%$ of the values are within 3 (i.e., k=3) times the standard deviations σ from the mean value μ (i.e., within the range of $(\mu-3\sigma, \mu+3\sigma)$).

Chebyshev's inequality is expressed by the following expressions:

$$Pr(|C[t]-\mu[t]| \geq k\sigma[t]) 1/k^2, \text{ or}$$

$$Pr(|C[t]-\mu[t]| \leq k\sigma[t]) \geq 1-1/k^2,$$

where, k: region coefficient.

These expressions represent that at most $1/k^2 \times 100\%$ of the signal quality values C[t] are outside the range of $(\mu-k\sigma, \mu+k\sigma)$, and that at least $(1-1/k^2) \times 100\%$ of the signal quality values C[t] are within the range of $(\mu-k\sigma, \mu+k\sigma)$.

For each signal quality value C[t], Chebyshev's inequality is satisfied if the signal quality value C[t] lies within the range of $(\mu-k\sigma, \mu+k\sigma)$, which means that this condition is a precondition based on Chebyshev's inequality. This precondition is expressed with the following inequality:

$$|C[t]-\mu[t]| \leq k\sigma[t], \text{ or}$$

$$\mu[t]-k\sigma[t] \leq C[t] \leq \mu[t]+k\sigma[t].$$

A determination that a present signal quality value C[t] does not satisfy the above inequality, that is, $$\mu[t]-k\sigma[t] \leq C[t] \leq \mu[t]+k\sigma[t].$$

would mean that the present signal quality varies greatly from the past signal quality.

Non-satisfaction of the inequality is categorized into the following two cases:

<--->($\mu[t]+k\sigma[t]$)≦$C[t]$], and      Non-satisfaction [1]

$C[t]$≦($\mu[t]-k\sigma[t]$)<---> .      Non-satisfaction [2]

Non-satisfaction [1] would mean that the present signal quality is better than the previous signal quality. Non-satisfaction [2], however, would mean that the present signal is worse than the previous signal quality.

When the present signal quality is better than the previous signal quality (i.e., when non-satisfaction [1] is selected), even if the variation in the signal quality is relatively large, there is no need for frequent monitoring or observation of the signal quality, and therefore, the time intervals Δt which the signal quality is measured are allowed to be Δt2 longer than Δt2'.

In contrast, when the present signal quality is worse than the previous signal quality (i.e., when non-satisfaction [2] is selected), there is a need to shorten the time intervals Δt at which the signal quality is measured, so as to equal Δt2' shorter than Δt2, to thereby monitor the signal quality more frequently.

It is added that, the larger the region coefficient k, the smaller the likelihood that the predetermined inequality is not satisfied. On the other hand, the smaller the region coefficient k, the larger the likelihood that the predetermined inequality is not satisfied.

Figure 4:
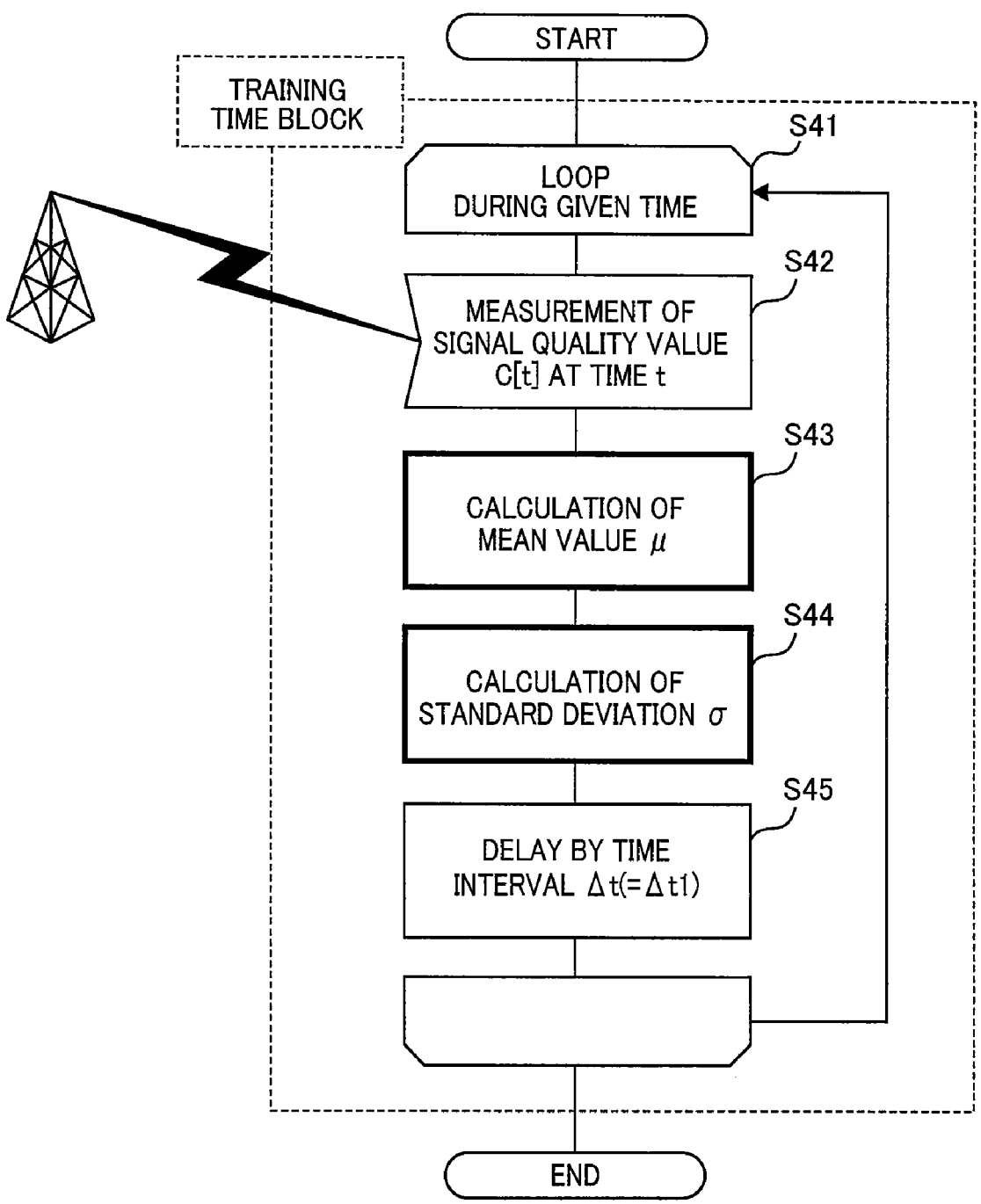
FIG. 4 is a flowchart schematically illustrating in more detail a step S21 implemented during a training time block, which is depicted in FIG. 2.

Referring next to FIG. 4, the process during the training time block is illustrated in flow chart.

Step S41

During the training time block, the following steps S41-S45 are looped for repeated execution of a predetermined period of time.

Step S42

The signal quality value C[t] at time t is measured.

Step S43

The mean value μ of successively-measured signal quality values C[t] is calculated.

The mean value μ may be calculated as an exponentially smoothed average, by exponential smoothing. The exponential smoothing would reduce potential effects of rapid change in the signal quality, allowing the average μ to be calculated for an extended length of time with improved accuracy. The exponentially smoothed average μ is calculated with the following equation:

$$\mu[t]=(1-\alpha)\times\mu[t-1]+\alpha\times C[t],$$

where,

α: forgetting factor or smoothing factor.

The forgetting factor α is a parameter for determining how much the accumulation of the previous signal quality values (i.e., the previous average μ) is to be weighted.

A greater α will give greater weight to the latest signal quality value, and the ultimate average μ is calculated as if it were calculated from signal quality values measured at shorter time intervals.

On the other hand, a smaller α will give greater weight to the accumulation of the previous signal quality values, and the ultimate average μ is calculated as if it were calculated from signal quality values measured at longer time intervals.

Alternatively, the mean value μ may be an arithmetic mean calculated over the time range of (t−L+1, t), with the following equation:

$$\mu[t]=(1/L)\times\Sigma C[T],$$

where,

L: a count of signal quality values C[t] to be summed up, and

ΣC[T]: a total sum of a set of signal quality values C[t] over the time range of T=t−L+1 to T=t.

Step S44

The standard deviation σ is calculated of the successively-measured signal quality values C[t]. When the step S43 calculates the mean value μ as an exponentially smoothed average, the standard deviation σ is calculated with the following equation:

$$\sigma[t]=\sqrt{(Sqr[t]-\mu[t]^2)},$$

where,

Sqr: square root, and $$Sqr[t]=(1-\alpha)\times Sqr[t-1]+\alpha\times C[t]^2, \text{ and}$$

α: forgetting factor.

In contrast, when the step S43 calculates the mean value μ as an arithmetic mean, the standard deviation σ is calculated with the following equation:

$$\sigma[t]=\sqrt{(1/L)\times\Sigma(C[T]-\mu[t])^2)},$$

where, $\Sigma(C[T]-\mu[t])^2$: a total sum of a set of $(C[T]-\mu[t])^2$ over the time range of T=t−L+1 to T=t.

Step S45

This process ends with a step S45 to wait the same length of the time interval Δt(=Δt1) for required delay. Thereafter, this process proceeds to the step S41. It is added that the time interval Δt1 used during the training time block is relatively short (i.e., Δt1<Δt2'<Δt2).

Figure 5A:
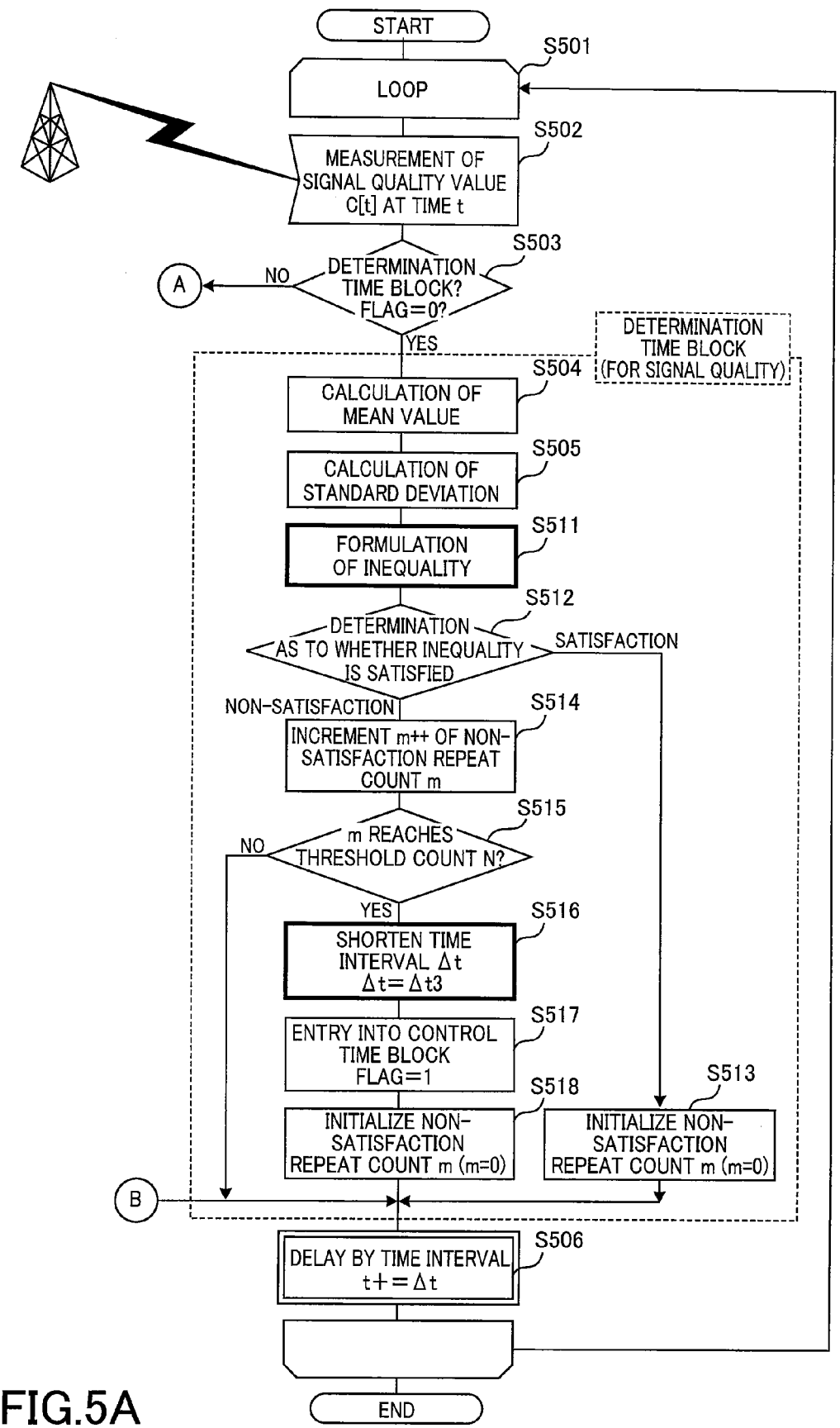
FIG. 5A is a flow chart schematically illustrating in more detail steps S22-S25 implemented during a determination time block, which are depicted in FIG. 2.
Figure 5B:
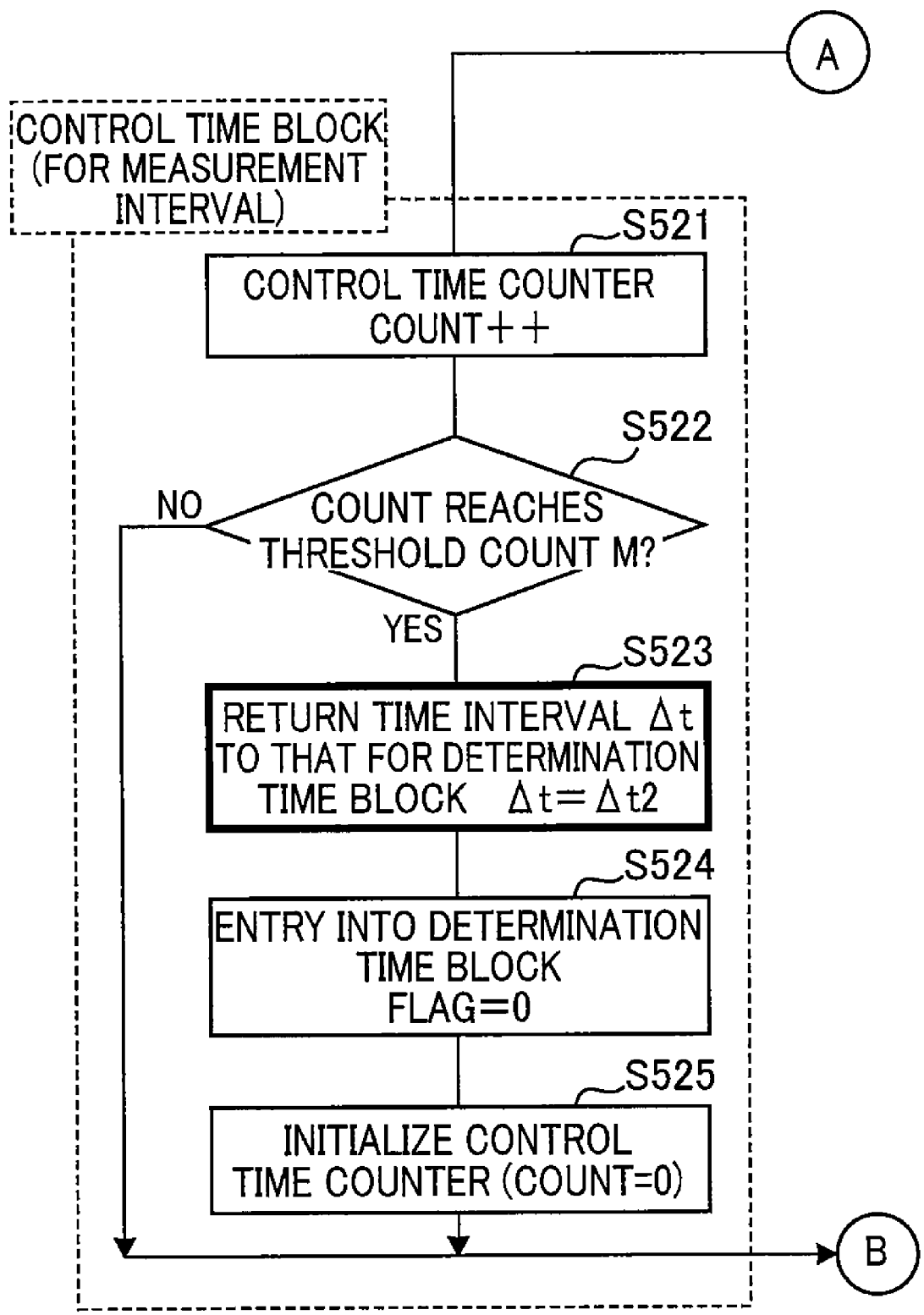
FIG. 5B is a flow chart schematically illustrating in more detail a step S26 implemented during a control time block, which is depicted in FIG. 2.

Referring next to FIGS. 5A and 5B, the processes during the determination time block and the control time block are illustrated in flow chart.

Step S501

The following steps S502-S505 are looped and repeatedly executed.

Step S502

The signal quality value C[t] at time t is calculated.

Step S503

The process is branched depending on which one of the determination time block or the control time block the process enters.

"Flag=0" indicates that the process enters the determination time block, while "Flag=1" indicates that the process enters the control time block. The initial status of the Flag is, for example, 0.

If it is during the determination time block (i.e., Flag=0), the time intervals Δt are set to Δt2 or Δt2' which is longer than Δt1 and Δt3 because the variation in the signal quality is relatively small. During the determination time block, a determination is being made as to whether a timing has come that the variation in the signal quality has become larger than the previous signal quality.

Step S504

If it is during the determination time block (i.e., Flag=0), then the mean value μ of successively-measured signal quality values C[t] is calculated.

Step S505

The standard deviation σ is calculated of the successively-measured signal quality values C[t].

Step S511

To begin with, the aforementioned inequality is generated or formulated using the mean value μ and the standard deviation σ.

Step S512
A determination is made as to whether the present signal quality value C[t] satisfies the generated inequality.

Step S513
If it is determined that the inequality is satisfied, then non-satisfaction repeat count m is initialized (set m=0) that indicates the number of times that non-satisfaction of the inequality is consecutively repeated. Then, the process proceeds to a step S506.

Step S514
If it is determined that the inequality is not satisfied, then the non-satisfaction repeat count m is incremented by "1" (m++).

Step S515
A determination is made as to whether the non-satisfaction repeat count m has reached threshold count N. If the non-satisfaction repeat count M has not reached the threshold count N, then the process proceeds to the step S506. The process of determining whether the inequality is satisfied is repeated until the non-satisfaction repeat count m reaches the threshold count N, allowing the determination to be made with increased accuracy.

It is added that the threshold count N may be a fixed value or a variable value depending on the type of a currently-selected one of different wireless communication systems, or depending on how good or poor the signal quality is.

Step S516
If the non-satisfaction repeat count M has reached the threshold count N, then the time interval Δt is set to Δt3 which is relatively short (i.e., Δt3<Δt2).

Step S517
To enter the control time block, "Flag=1" is set.

Step S518
The non-satisfaction repeat count m is initialized (set m=0). Thereafter, the process proceeds to the step S506.

Step S521
During the control time block (i.e., while "Flag=1"), the variation in the signal quality is large, and therefore, the time interval Δt is relatively short. A given time elapses. To begin with, a control time counter "Count" is incremented by "one." The "control time counter" is a counter for measuring the time length that has lapsed during the control time block.

Step S522
A determination is made as to whether the control time counter "Count" has reached threshold count M. The control time block has a maximum length of time which is equal to "Δt×threshold count M." If the control time counter "Count" has not reached the threshold count M, then the process proceeds to the step S506.

It is added that the threshold count M may be a fixed value or a variable value depending on the type of a currently-selected one of different wireless communication systems, or depending on how good or poor the signal quality is.

Step S523
If the control time counter "Count" has reached the threshold count M, then the time interval Δt returns to Δt2 longer than Δt1 and Δt3).

In an implementation of the step S523, when non-satisfaction [1] is selected, the present signal quality is better than the previous signal quality, without any need for frequent monitoring or observation of the signal quality, and therefore, the time intervals Δt at which the signal quality is measured are set to Δt2 longer than Δt2'.

In an alternative implementation of the step S523, when non-satisfaction [2] is selected, the present signal quality is worse than the previous signal quality, with a need to shorten the time intervals Δt which the signal quality is measured, so as to equal Δt2' shorter than Δt2, to thereby monitor the signal quality more frequently.

Step S524
To enter the determination time block, "Flag=0" is set.

Step S525
The control time counter "Count" is initialized (set Count=0).

Thereafter, the process proceeds to the step S506.

In an alternative implementation, the step S525 may be implemented to determine whether the inequality is satisfied, prior to termination of the control time block. It would be better to terminate the control time block if the variations in the signal quality have become smaller.

In this alternative implementation, therefore, if the count of the times that the inequality has been successively satisfied reaches the threshold count L, then a determination is made that the process enters the determination time block.

In an example where k=1.3 and L=3, if the inequality has been successively satisfied three times in succession, the probability that the variations in the recent signal quality values can be relatively small is about 80%.

It is added that the threshold count L may be a fixed value or a variable value depending on the type of a currently-selected one of different wireless communication systems, or depending on how good or poor the signal quality is.

Step S506
At the end of this routine, the process waits the same length of time as the current time interval Δt for required delay. Thereafter, the process proceeds to the step S501.

In this regard, the current time interval Δt is controlled, such that it equals Δt2 if the process enters or stays in the determination time block, while it equals Δt3 if the process enters or stays in the control time block.

Figure 6:
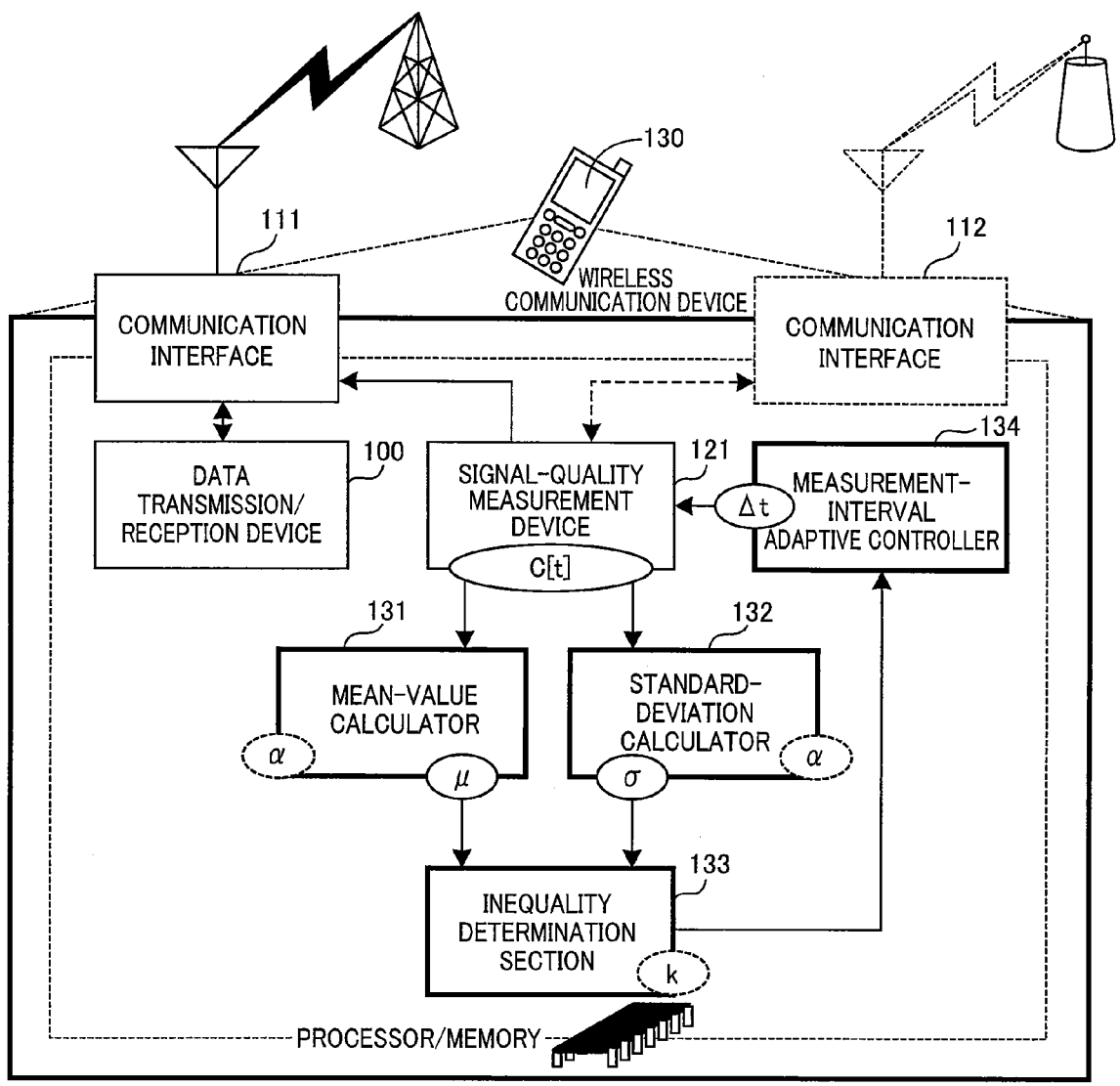
FIG. 6 is a functional block diagram schematically illustrating the wireless communication device according to the first illustrative embodiment.

Referring next to FIG. 6, the wireless communication device 130 according to the present embodiment is illustrated in functional block diagram.

As illustrated in FIG. 6, the wireless communication device 130 is configured by replacing the FIR filter 122 and the time-interval controller 123 with a mean-value calculator 131, a standard-deviation calculator 132, an inequality determination section 133, and a measurement-interval adaptive controller 134.

These functions of the wireless communication device 130 are implemented by causing the processor to execute the signal-quality measurement program. The processor is mounted in the wireless communication device 130.

The mean-value calculator 131 is configured to calculate the mean value μ of successively-measured signal quality values C[t], with a selected one of the following equations:

[Exponentially Smoothed Average]

$$\mu[t]=(1-\alpha)\times\mu[t-1]+\alpha\times C[t],$$

where,

α: forgetting factor or smoothing factor, and

[Arithmetic Mean Value]

$$\mu[t]=(1/L)\times\Sigma C[T],$$

where,

L: a count of signal quality values C[t] to be summed up, and

ΣC[T]: a total sum of a set of signal quality values C[t] over the time range of T=t−L+1 to T=t.

The standard-deviation calculator 132 is configured to calculate the standard deviation of the successively-measured signal quality values C[t], with a selected one of the following equations:

[When Exponentially Smoothed Average is selected]

$$\sigma[t]=\sqrt{(Sqr[t]-\mu[t]^2)},$$

where,
Sqr: square root, and $$Sqr[t]=(1-\alpha)\times Sqr[t-1]+\alpha\times C[t]^2, \text{ and}$$

α: forgetting factor, and
[When Arithmetic Mean Value is selected]

$$\sigma[t]=\sqrt{(1/L)\times\Sigma(C[T]-\mu[t])^2)},$$

where,
$\Sigma(C[T]-\mu[t])^2$: a total sum of a set of $(C[T]-\mu[t])^2$ over the time range of T=t−L+1 to T=t.

The inequality determination section 133 is configured to determine whether the following inequality is satisfied for a set of the mean value μ[t], the standard deviation σ[t] and the signal quality value C[t] at present time:

$$|C[t]-\mu[t]|\leq k\sigma[t], \text{ or}$$

$$\mu[t]-k\sigma[t]\leq C[t]\leq \mu[t]+k\sigma[t],$$

where,
k: region coefficient.

The inequality is a precondition based on Chebyshev's inequality for the signal quality value C[t].

The measurement-interval adaptive controller 134 is configured to set the time interval Δt to Δt3 which is shorter than Δt2, if non-satisfaction of the inequality is determined.

In a preferred implementation, the measurement-interval adaptive controller 134 may be configured to set the time interval Δt to Δt3, if non-satisfaction of the inequality is determined m or more times in succession.

The measurement-interval adaptive controller 134 is further configured to set the time interval Δt to Δt2 which is longer than Δt3, if satisfaction of the inequality is determined.

More specifically, the measurement-interval adaptive controller 134 controls the time interval Δt, such that the time interval Δt is longer when the predetermined inequality is not satisfied and when the signal quality value C[t] is larger than the mean value μ, that is, when non-satisfaction [2] is met, than when the predetermined inequality is not satisfied and when the signal quality value C[t] is smaller than the mean value μ, that is, when non-satisfaction [1] is met.

It is added that, where the wireless communication device 130 incorporates the communication interfaces 111 and 112 operating under respective different communication systems including first and second communication systems, there is a need to handover the first communication system using the communication interface 111, to the second communication system using the communication interface 112. In this case, the signal-quality measurement device 121 is required to measure signal quality for the communication interface 112.

Figure 7A:
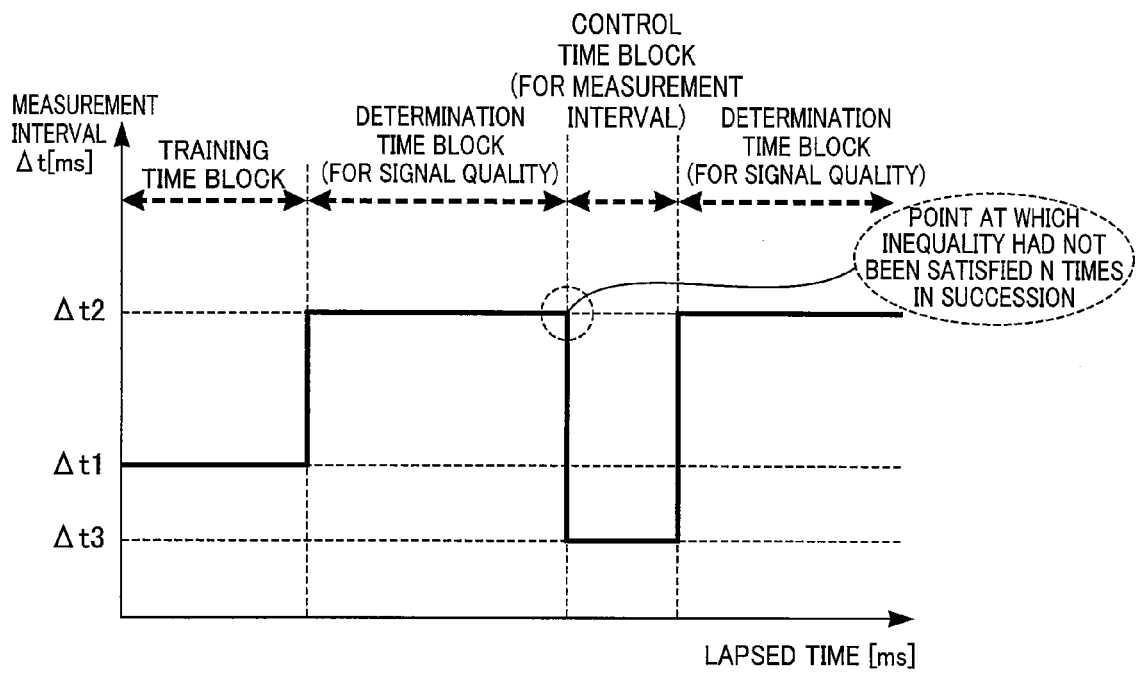
FIG. 7A is a graph for illustrating temporal changes in measurement intervals Δt in an example of the first illustrative embodiment.
Figure 7B:
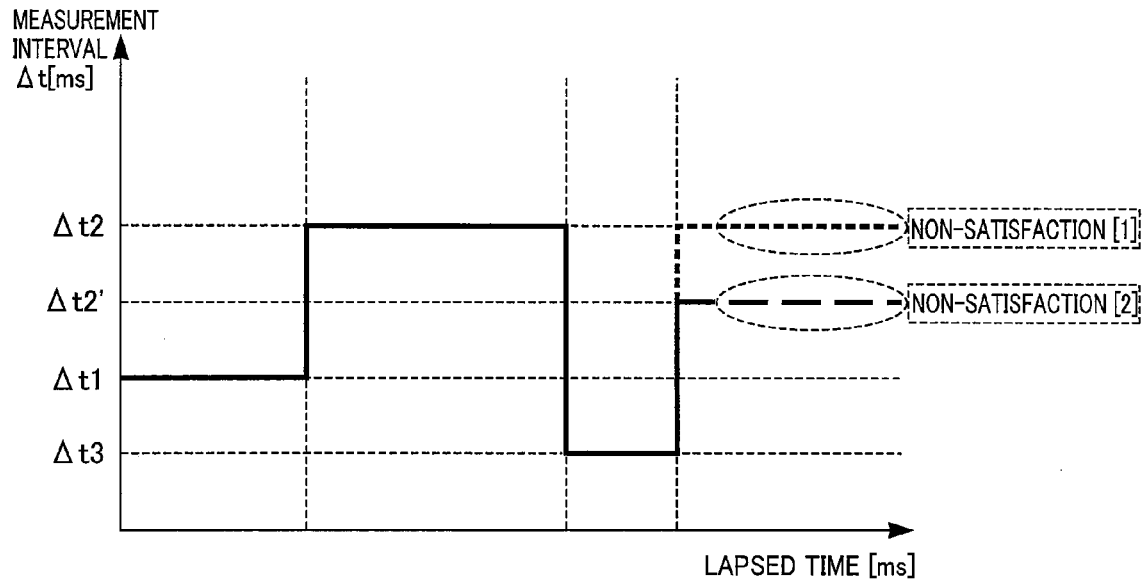
FIG. 7B is a graph for illustrating temporal changes in measurement intervals Δt in an alternative example of the first illustrative embodiment.

Referring next to FIGS. 7A and 7B, first and second examples of a time series of changes in the time intervals Δt are illustrated in graph, respectively.

For the first example of FIG. 7A, the time intervals Δt1, t2 and Δt3 are defined as follows:

Δt2>Δt1,
Δt2>Δt3,
Δt1: time intervals for the training time block,
Δt2: time intervals for the determination time block, and
Δt3: time intervals for the control time block.

If change in the signal quality becomes rapid, the process enters the control time block in which the time intervals Δt are controlled to become equal to Δt3 which is shorter than Δt2. On the other hand, if change in the signal quality becomes gentle, the process enters the determination time block in which the time intervals Δt are controlled to become equal to Δt2 which is longer than Δt1 and Δt3.

For the second example of FIG. 7B, the time intervals Δt1, Δt2, Δt2' and Δt3 are defined as follows:

Δt2>Δt2'>Δt3,
Δt2>Δt2'>Δt1,
Δt2: time intervals applied when non-satisfaction [1] (i.e., (μ[t]+kσ[t])≦C[t]) is met, and
Δt2': time intervals applied when non-satisfaction [2] (i.e., C[t]≦(μ[t]−kσ[t])) is met.

If the present signal quality has become better than the previous signal quality, that is, non-satisfaction [1] is met, even if the signal quality changes rapidly, the time interval can be Δt2 which is longer than Δt2', and, on the other hand, if the present signal quality has become worse than the previous signal quality, that is, non-satisfaction [2] is met, there is a need to control the time interval to be Δt2' which is shorter than Δt2, for more frequent check on the variation in the signal quality.

Figure 8:
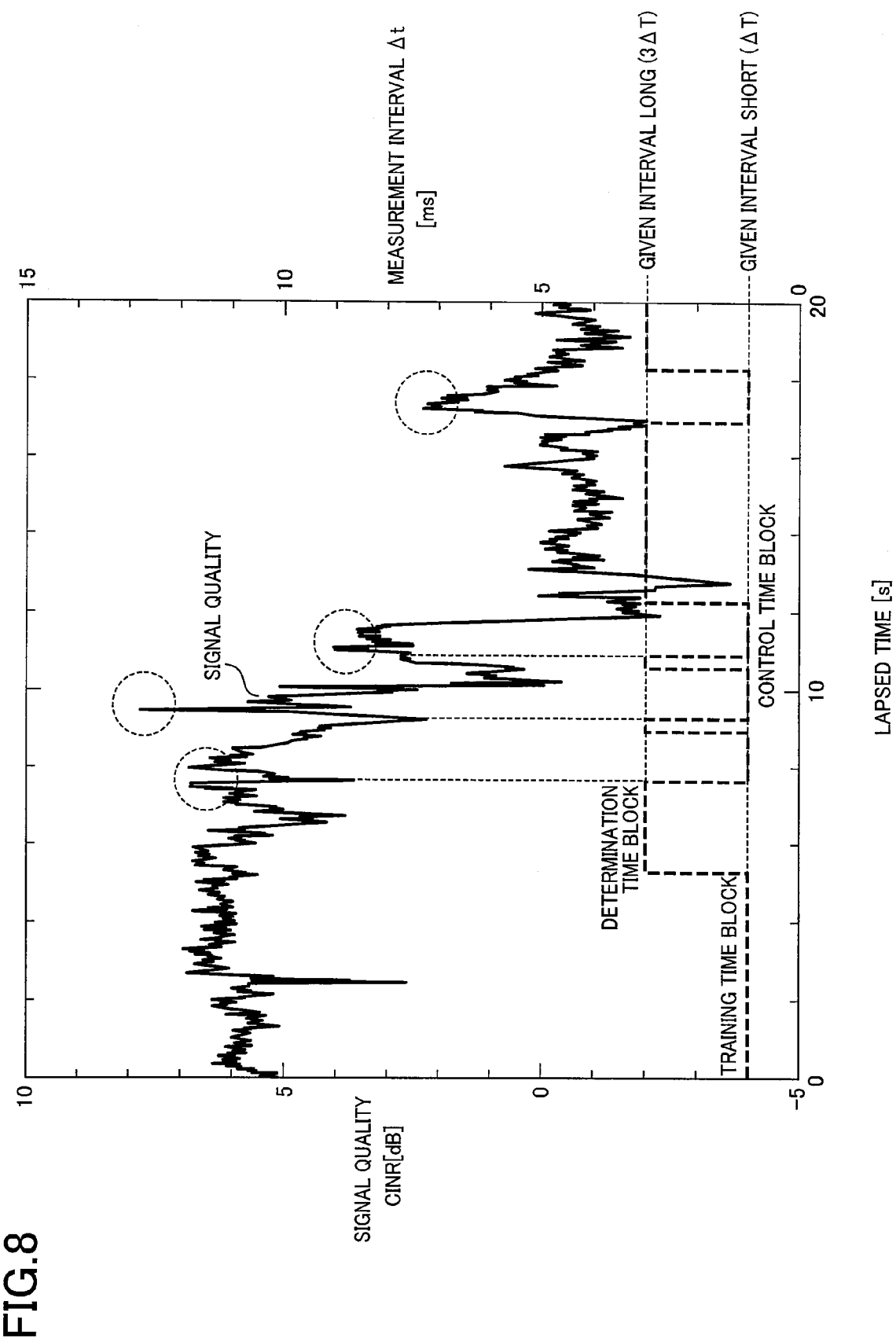
FIG. 8 is a graph for illustrating a simulation result of temporal changes in measurement intervals Δt in the first illustrative embodiment.

Referring next to FIG. 8, there is illustrated in graph a time series of changes in the time intervals Δt which resulted from an analysis by simulation as described below.

FIG. 8 depicts temporal variations in the signal quality (i.e., CINR) measured at time intervals ΔT (=26.66 [ms]), and temporal changes in the time intervals Δt (i.e., measurement intervals).

The above-mentioned simulation was performed with each kind of time interval Δt set to any one of integer multiples of ΔT, with all the parameters defined as follows:

Period of time for each cycle of training time block: 200ΔT [ms],
Time intervals applied for training time block: Δt1=ΔT [ms],
Time intervals applied for determination time block: Δt2=3ΔT[ms],
Time intervals applied for control time block: Δt3=ΔT [ms],
Threshold of non-satisfaction repeat count for inequality: N=3,
Threshold of control time counter: M=50,
Region coefficient of the inequality: K=1.3, and
Forgetting factor of mean value μ and standard deviation σ: α=0.2.

As illustrated in FIG. 8, when the signal quality changes rapidly (e.g., around positions at t=8-12 [s] and t=18 [s]), the process enters the control time block in which the time interval Δt is shortened. In other words, in the present embodiment, the time interval Δt is controlled such that it is extended when the signal quality changes gently, while it is shortened when the signal quality changes rapidly.

As illustrated in FIG. 8, the region coefficient k is set to 1.3. In this settings, at most 1/1.69×100 (almost equal to 60%) of the signal quality values lie outside the range of $$(\mu[t]-1.3\times\sigma[t], \mu[t]+1.3\times\sigma[t]).$$

This means that the signal quality value C[t], if lies outside that the above-mentioned range, changes rapidly relative to the status of the previous signal quality.

In the present embodiment in which N=3, the probability that the inequality is satisfied three times in succession is at most $(1/1.69)^3$ (almost equal to 20%). This is equivalently viewed that the probability that the present signal quality changes more rapidly than the previous signal quality is at most 20%.

As will be easily understood from the above, the present embodiment, by making a determination as to whether a present signal-quality-value satisfies a predetermined inequality which represents that a signal quality value lies within k times the standard deviations away from the mean value, would allow time intervals at which signal quality values are measured, to be controlled adaptively to changes in the signal quality values, without requiring an increased amount of computation for monitoring the signal quality values.

Notably, relative to the calculation by an FIR filter, the calculation of the mean value μ and the standard deviation σ in the present embodiment is simpler, allowing a large part of the computation required to be reduced.

Further, in the present embodiment, time intervals at which signal quality is measured are extended when signal quality changes gently, avoiding wasteful measurement of signal quality, which is conducive to reduction in the whole power consumption by the wireless communication device 130.

Next, a wireless communication device according to a second illustrative embodiment of the present invention will be described.

In view of the fact that the present embodiment is common in construction to the first embodiment with respect to many elements, only the different elements in the present embodiment will be described below in more detail with reference to FIG. 9, while the common elements of the present embodiment to those of the first embodiment will be referenced the same reference numerals or names as those in the description and illustration of the first embodiment, without a redundant description and illustration.

Figure 9:
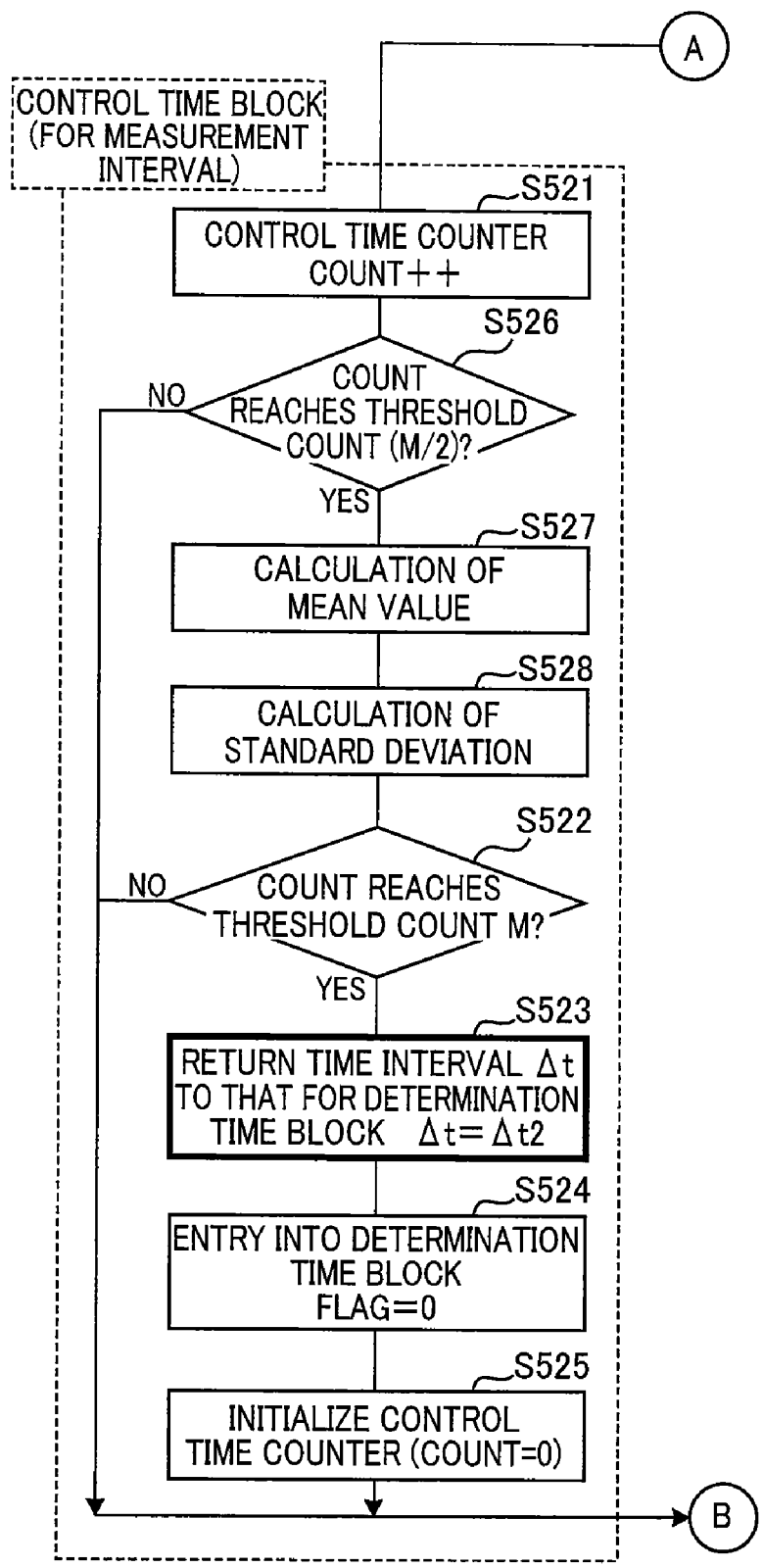
FIG. 9 is a flow chart schematically illustrating a fraction of a computer-executable program for measuring signal quality of a received wireless signal by a wireless communication device constructed according to a second illustrative embodiment of the present invention, wherein, with the fraction depicted in FIG. 9, steps depicted in FIG. 5B are replaced to modify the program according to the first illustrative embodiment into that according to the second illustrative embodiment.

FIG. 9 is a flow chart schematically illustrating a fraction of a computer-executable program for measuring signal quality of a received wireless signal by the wireless communication device constructed according to the present embodiment. With FIG. 9, FIG. 5B is replaced for modifying the first illustrative embodiment into the present embodiment.

More specifically, with the steps depicted in FIG. 9, the steps depicted in FIG. 5B are replaced to modify the signal-quality measurement program according to the first embodiment into that according to the present embodiment.

The process enters the control time block during which the steps S521-S525 are implemented, where signal transmission paths rapidly change in state (i.e., the aforementioned inequality is not satisfied). As a result, during the thus-situated control time block, it is not preferable to calculate mean value μ or standard deviation σ. Therefore, in the first embodiment, during the entirety of the control time block, no mean value and no standard deviation is calculated.

In contrast, in the present embodiment, as illustrated in FIG. 9, steps S526-S528 are implemented during the last half of each cycle of the control time block, in order to calculate mean value μ and standard deviation σ, as described in more detail below.

Step S526

A determination is made as to whether the control time counter Count is not less than one half of the threshold count M (=M/2). Unless the Count is not less than M/2, then the process proceeds to the Step S506.

Step S527

If the control time counter Count is not less than one half of the threshold count M (=M/2), then mean value μ is calculated of successively-measured signal quality values C[t].

Step S528

Standard deviation σ is calculated of the successively-measured signal quality values C[t].

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A wireless communication device, comprising:
a measurement device configured to successively measure, at variable time intervals Δt, signal quality values C[t] of a wireless signal received by the wireless communication device, wherein C[t] denotes a signal quality value of the received wireless signal measured at time t;
a mean-value calculator configured to calculate mean value μ of the successively-measured signal quality values C[t];
a standard-deviation calculator configured to calculate standard deviation σ of the successively-measured signal quality values C[t];
a determination section configured to make a determination as to whether the signal quality value C[t] at present time satisfies a predetermined inequality which represents that a signal quality value C[t] at arbitrary time lies within k times the standard deviations σ away from the mean value μ, wherein k denotes a region coefficient; and
an adaptive controller configured to control lengths of the time intervals Δt for the measurement device, based on the determination made by the determination section, wherein the adaptive controller relatively shortens the time intervals Δt if the predetermined inequality is not satisfied.

2. The wireless communication device according to claim 1, wherein the predetermined inequality is an inequality which represents a precondition based on Chebyshev's inequality.

3. The wireless communication device according to claim 1, wherein the adaptive controller relatively extends the time intervals Δt if the predetermined inequality is satisfied.

4. The wireless communication device according to claim 1, wherein the adaptive controller relatively shortens the time intervals Δt if a count of times that the determination section consecutively determines that the predetermined inequality is not satisfied reaches a predetermined count m.

5. The wireless communication device according to claim 1, wherein the mean-value calculator is configured to calculate the mean value μ as an exponentially smoothed average, with the following equation:

$$\mu[t]=(1-\alpha)\times\mu[t-1]+\alpha\times C[t],$$

where,

α: forgetting factor, and the standard-deviation calculator is configured to calculate the standard deviation σ, with the following equation:

$$\sigma[t]=\sqrt{(Sqr[t]-\mu[t]^2)},$$

where, $$Sqr[t]=(1-\alpha)\times Sqr[t-1]+\alpha\times C[t]^2, \text{ and}$$

α: forgetting factor.

6. The wireless communication device according to claim 1, wherein the mean-value calculator is configured to calculate the mean value μ as an arithmetic mean over a range of (t−L+1, t), with the following equation:

$$\mu[t]=(1/L)\times\Sigma C[T],$$

where,

L: a count of signal quality values C[t] to be summed up, and

ΣC[T]: a total sum of a set of signal quality values C[t] over a range of T=t−L+1 to T=t, and the standard-deviation calculator is configured to calculate the standard deviation σ, with the following equation:

$$\sigma[t]=\sqrt{(1/L)\times\Sigma(C[T]-\mu[t])^2},$$

where,

Σ(C[T]−μ[t])²: a total sum of a set of (C[T]−μ[t])² over a range of T=t−L+1 to T=t.

7. The wireless communication device according to claim 1, wherein the predetermined inequality is $$Abs(C[t]-\mu[t])\leq k\sigma[t],$$

where,

Abs(C[t]−μ[t]): an absolute value of (C[t]−μ[t]).

8. The wireless communication device according to claim 1, wherein the adaptive controller controls the time intervals Δt, such that the time intervals Δt are longer when the predetermined inequality is not satisfied and when the signal quality value C[t] at present time is larger than the mean value μ, than when the predetermined inequality is not satisfied and when the signal quality value C[t] at present time is smaller than the mean value μ.

9. The wireless communication device according to claim 1, wherein each of the signal quality values C[t] represents a signal to noise ratio of the received wireless signal.

10. The wireless communication device according to claim 1, further comprising a plurality of communication interfaces used for respective different wireless communication systems, the communication interfaces including first and second communication interfaces, and the wireless communication systems including first and second wireless communication systems, wherein the measurement device is configured to measure the signal quality values C[t] of a wireless signal received via the second communication interface, during transmission/reception via the first communication interface used for the first wireless communication system, for handing over the first wireless communication system used for the first communication interface, to the second wireless communication system used for the second communication interface.

11. A method of measuring signal quality of a wireless communication device, comprising the steps of:

successively measuring, at variable time intervals Δt, signal quality values C[t] of a wireless signal received by the wireless communication device, wherein C[t] denotes a signal quality value of the received wireless signal measured at time t;

calculating mean value μ of the successively-measured signal quality values C[t];

calculating standard deviation σ of the successively-measured signal quality values C[t];

making a determination as to whether the signal quality value C[t] at present time satisfies a predetermined inequality which represents that a signal quality value C[t] at arbitrary time lies within k times the standard deviations σ away from the mean value μ, wherein k denotes a region coefficient; and adaptively controlling lengths of the time intervals Δt, based on the determination, wherein the step of adaptively controlling includes a substep of relatively shortening the time intervals Δt if the predetermined inequality is not satisfied.

* * * * *